United States Patent [19]

Sethy

[11] 4,209,359
[45] Jun. 24, 1980

[54] PROCESS FOR REMOVING RESIDUAL OXYGEN FROM OXYGEN-BLEACHED PULP

[75] Inventor: Anil Sethy, Middletown, N.Y.

[73] Assignee: International Paper Company, New York, N.Y.

[21] Appl. No.: 954,232

[22] Filed: Oct. 23, 1978

[51] Int. Cl.² .................. D21C 9/10; D21C 11/06
[52] U.S. Cl. ........................ 162/29; 162/57; 162/59; 55/52; 55/204
[58] Field of Search .......... 55/52, 203, 204, 192, 55/193, 424, 203; 366/263; 162/65, 380, 57, 59, 380, 29; 209/211

[56] References Cited

U.S. PATENT DOCUMENTS

| | | | |
|---|---|---|---|
| 1,734,507 | 11/1929 | Westling et al. | 55/203 |
| 2,183,763 | 12/1939 | Brown | 55/192 |
| 2,277,069 | 3/1942 | Burwell | 55/416 |
| 2,316,729 | 4/1943 | Tryon | 55/203 |
| 2,711,644 | 6/1955 | Myers | 55/199 |
| 3,271,929 | 9/1966 | Bowden et al. | 55/52 |
| 3,432,036 | 3/1969 | Kaiser | 55/194 |
| 3,498,762 | 3/1970 | Van Der Schec et al. | 23/285 |
| 3,503,846 | 3/1970 | Nardi | 162/236 |
| 3,807,142 | 4/1974 | Rich et al. | 55/204 |
| 3,814,664 | 6/1974 | Carlsmith | 162/237 |
| 3,832,276 | 4/1974 | Roymoulik et al. | 162/65 |
| 3,963,561 | 6/1976 | Richter | 162/65 |
| 3,964,962 | 6/1976 | Carlsmith | 162/41 |
| 4,022,654 | 5/1977 | Engstrom et al. | 162/65 |
| 4,093,511 | 6/1978 | Richter | 162/237 |
| 4,113,452 | 9/1978 | Brown et al. | 55/203 |
| 4,149,860 | 4/1979 | Kulik | 55/193 |

FOREIGN PATENT DOCUMENTS

| | | | |
|---|---|---|---|
| 2460144 | 7/1975 | Fed. Rep. of Germany | 162/65 |
| 1484581 | 2/1974 | United Kingdom | 55/203 |

*Primary Examiner*—S. Leon Bashore
*Assistant Examiner*—Steve Alvo
*Attorney, Agent, or Firm*—Stephen P. Gilbert

[57] ABSTRACT

A method for removing residual oxygen from an aqueous slurry of pulp that has been oxygen-bleached is disclosed. The slurry, usually containing no more than 3 weight percent fiber, is agitated by a radial-flow impeller, which imparts a substantially radial flow to the slurry. If the residual oxygen is not removed, it may degas at an inopportune moment during later processing (for example, washing) and carry some of the wood fibers to the surface of the slurry, thereby forming a foamy mat, which hinders further processing.

7 Claims, 6 Drawing Figures

PROCESS FOR REMOVING RESIDUAL OXYGEN FROM OXYGEN-BLEACHED PULP

BACKGROUND OF THE INVENTION

This invention relates to the degassing of a pulp slurry following oxygen bleaching. Bleaching is employed to delignify and whiten brown stock from a wood digestion process.

In recent years oxygen has often been used as the bleaching agent, in place of the chlorine that was formerly the principal chemical used. The use of oxygen reduces the effluent from the bleaching step. Bleaching processes employing oxygen are disclosed in U.S. Pat. Nos. 3,814,664, 3,832,276, 3,963,561, 3,964,962, and 4,022,654, all of which are hereby incorporated by reference. None of these, however, mentions the problems that can occur in the subsequent processing of an aqueous wood fiber slurry that has been oxygen-bleached. Degassing of residual oxygen could occur at an inopportune moment in such subsequent processing and cause the wood fibers to rise to the surface of the slurry, thereby forming a mat of such fibers, which hinders further processing.

Methods of removing gases from pulp slurries are suggested in U.S. Pat. Nos. 3,432,036 and 3,807,142. In the former, a number of hydrocyclones and a large vacuum tank are needed, which require a substantial capital outlay and a large amount of energy to maintain the vacuum. In the latter patent, a cyclone-type separator is used, but in actual operation, this type of separator has been found ineffective in removing residual oxygen.

SUMMARY OF THE INVENTION

Briefly, the present invention requires the use of an impeller that imparts a substantially radial flow to the pulp slurry. It is believed that the shear and high rate of energy dissipation provided by such a radial-flow impeller overcomes the interfacial forces between the fine bubbles of residual oxygen and the fibers in the slurry and allows the bubbles to agglomerate and degas.

The successful use of such an impeller to separate residual oxygen is surprising in view of the teaching in U.S. Pat. No. 3,832,276 (column 3, lines 21 to 45) that agitation can be used to disperse oxygen in a pulp slurry. Use of this invention prevents unexpected and inopportune degassing and the associated problems, and reduces the amount of defoamer required in subsequent processing.

BRIEF DESCRIPTION OF THE DRAWINGS

In order to more fully explain the present invention, the following drawings are provided in which.

Figure 1:
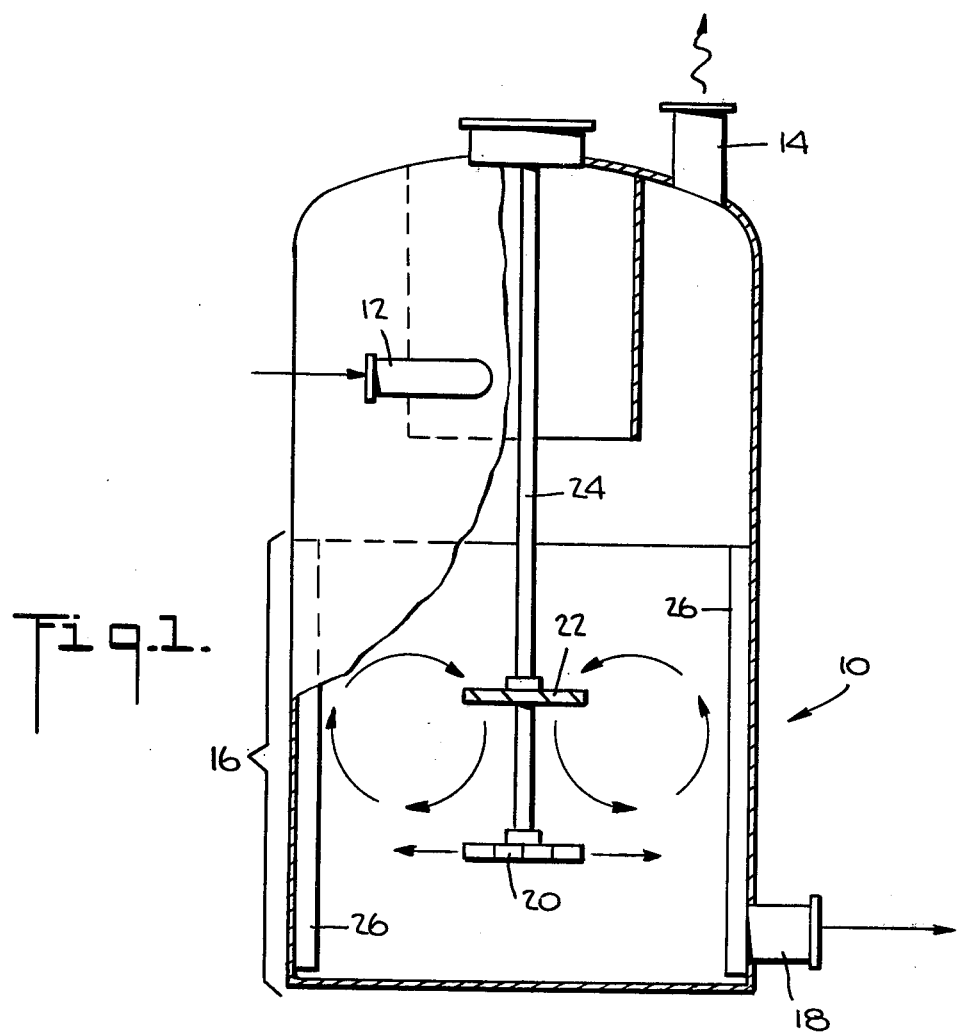
FIG. 1 is a side sectional view of a degassing vessel employing one embodiment of the present invention.

These drawings are provided for illustrative purposes and should not be construed to limit the scope of the invention.

DETAILED DESCRIPTION OF THE INVENTION

The present invention employs a radial-flow impeller to remove a significant portion of the residual oxygen from a wood fiber slurry following an oxygen-bleaching step. As used herein, a "radial-flow impeller" is one that imparts a "substantially radial flow" to the fluid. An impeller imparts a "substantially radial flow" when at least 50%, and, preferably, 80%, of the total flow leaving the tip(s) of the impeller is in the plane of the impeller's rotation. (See, for example, "Suspension of Solids" by J. E. Lyons in "Mixing," Vol. II (edited by V. W. Uhl and J. B. Gray), Academic Press, 1967, hereby incorporated by reference, for further discussion of radial-flow impellers.)

"Significant portion" of the residual oxygen means at least 50% of such oxygen. Preferably, at least 70% of the residual oxygen is removed through use of the present invention.

"Residual oxygen" is that which remains in the slurry after gross separation of oxygen and slurry following the oxygen-bleaching step. Such gross separation may be accomplished by conventional means in a section of the bleaching vessel, in a separate vapor-liquid separator, or in a section of a vessel employing the present invention. Preferably, at least some of the gross separation occurs in the top section of a vessel having a radial-flow impeller, in accordance with the present invention.

The amount of residual oxygen in the untreated slurry may be great as 350 ppm by weight of the slurry, usually up to 150 ppm, but preferably not greater than 100 ppm. The residual oxygen may be dissolved in the slurry, or entrained therein as fine gas bubbles, or both. Usually, 50 to 60% of the residual oxygen will be in the form of entrained bubbles, but it may be more or less, depending on the particular equipment configuration and operating conditions.

The consistency (fiber weight concentration) of the slurry is broadly from 0.01 to 10% and generally from 0.5 to 3.0% and the viscosity usually from 1 to 100 centipoises. Both hardwood and softwood pulps may be degassed using the present invention. Typical hardwoods are aspen, beech, birch, and maple; typical softwoods are spruce, pine, and fir. Generally, softwood pulps have longer fibers than hardwood pulps (longer fibers entrain greater volumes of residual oxygen).

In practicing the present invention, the slurry is fed to a vessel following an oxygen-bleaching step. The vessel may be of any shape or size but should provide a residence time for the slurry of from one second to thirty minutes, usually from 15 seconds to ten minutes, and, preferably, from thirty seconds to five minutes.

The radial-flow impeller may be of any shape and more than one may be used. Preferably, an "axial-flow impeller," which imparts a substantially axial flow to the slurry, is employed in the same vessel. Its function is to maintain top to bottom circulation of the slurry and prevent formation of a fiber mat on top of the liquid. An impeller imparts "substantially axial flow" when at least 50% of the flow leaving the tip(s) of the impeller is perpendicular to the plane of the impeller's rotation.

The tank, impeller(s), and other equipment in contact with the slurry may be of any materials of construction that are suitable for use under the prevailing operating conditions, particularly the slurry pH and temperature. Generally, mild steel or 304 stainless steel is used.

The liquid height (H) in the vessel should be from 50% to 200% of the vessel diameter (T), and, preferably, from 75 to 150% of T. (By "diameter" the equivalent diameter is meant. Formulas for calculating the equivalent diameter of vessels having non-circular cross sections are well-known.)

If an axial-flow impeller is used, in addition to the radial-flow impeller, it should be located above the radial-flow impeller and at a depth of from 10 to 50% of H and, preferably, at a depth of from 25 to 40% of H. (The depth is measured down from the average liquid height during operation.) In this case the radial-flow impeller (the lower impeller) would be located at a depth of from 50% of H down to a depth equal to H minus D (where D equals the diameter of the impeller) and, preferably, at a depth of from 60% of H down to H minus D. (For example, if H were ten feet and D were 3 feet, the radial-flow impeller would preferably be at a depth of from 6 feet to 7 feet.) The diameters of the impellers should range from 10% of T to 50% of T and, preferably, from 20% to 40% of T.

If only a radial-flow impeller is used, it should be located at a depth of from 20% of H down to H minus D and, preferably, from 40% of H down to H minus D. Its diameter should be from 10% to 75% of T and, preferably, from 20% to 50% of T.

The one or more impellers employed are usually driven by the same rotating means, although they need not be. The rotating means is usually an electric motor. Horsepower requirements vary depending on the slurry consistency, wood species, and number, size, and shape of the impellers, and range from 0.1 to 50 horsepower (U.S.) per thousand gallons (U.S.) of slurry. Usually from 0.25 to 10 horsepower per thousand gallons is used and, preferably, from 0.5 to 5 horsepower per thousand gallons.

Turning now to the drawings, FIG. 1 is a side cutaway view of degassing vessel 10 employing the present invention. Pulp slurry from an oxygen-bleaching vessel enters at nozzle 12. Nozzle 12 is tangentially positioned on the vessel to create a swirling motion in the slurry, thereby aiding the gross separation of oxygen from the slurry inside the vessel. The gas exits at nozzle 14. The fiber slurry, containing the residual oxygen, drops into the agitation portion 16 of the vessel, where residual gas is removed. The degassed slurry exits at nozzle 18.

Radial-flow impeller 20 and axial-flow impeller 22 are mounted on vertical shaft 24, which is attached to rotating means not shown. Four vertical baffles 26 (only two of which are shown) are symmetrically located in the vessel and prevent vortex formation, which represents a loss of energy (energy for vortex formation does not cause shear and the resultant degassing).

FIGS. 2, 3, 4, and 5 are perspective views of four radial-flow impellers. In all cases blades or paddles 28 are mounted on shaft 30.

Figure 6:
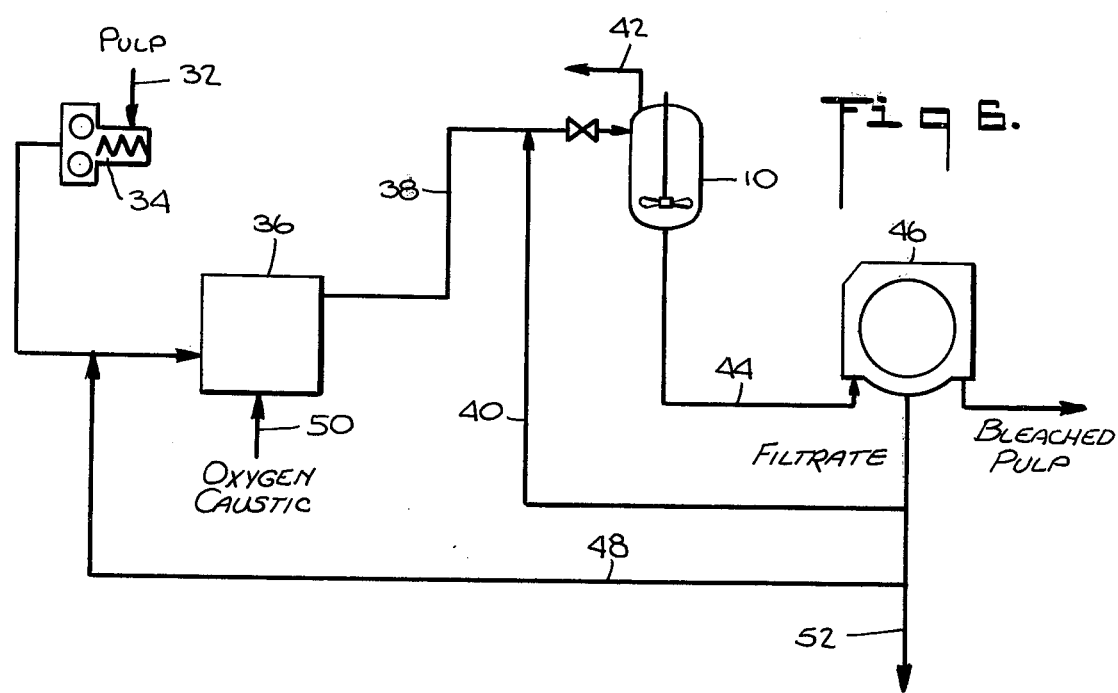
FIG. 6 is a block flow diagram showing the use of the present invention in an oxygen-bleaching sequence.
Figure 2:
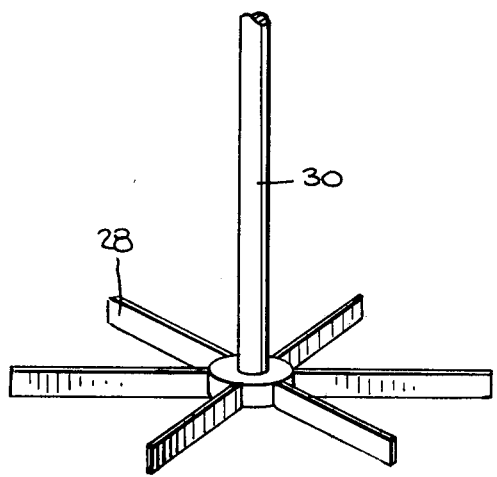
FIGS. 2 through 5 show several radial-flow impellers.
Figure 4:
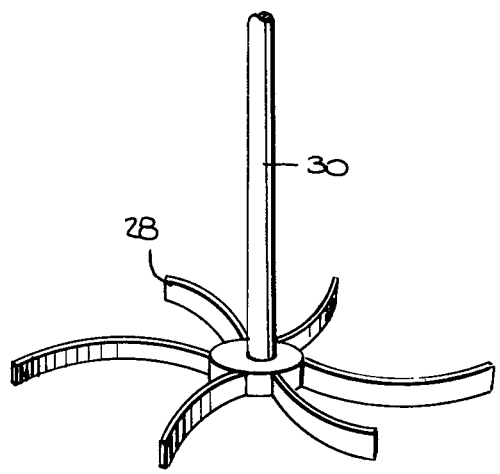
Figure 3:
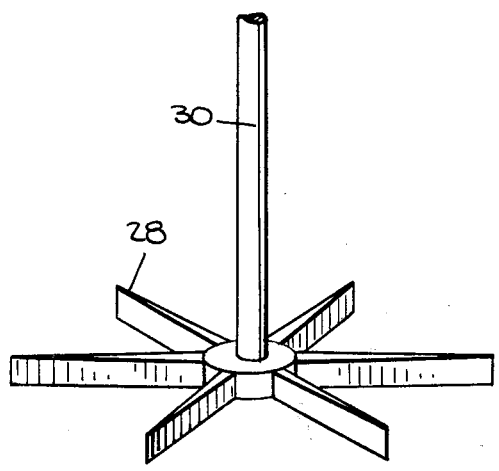
Figure 5:
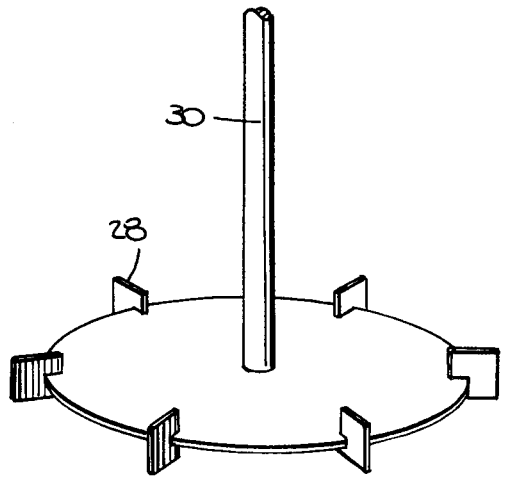

FIG. 6 is a schematic flow diagram of oxygen-bleaching-oxygen-removal steps. Unbleached pulp 32 is fed by screw feeder 34 to equipment represented by box 36, where the pulp is mixed with recycle filtrate 48 and oxygen and caustic 50, and bleached. Effluent 38 is combined with slip-stream 40 of recycle filtrate, the flow is throttled to reduce pressure, and the mixture is fed to gas separation vessel 10, shown in detail in FIG. 1. Degassing occurs in vessel 10, as described above. Oxygen exits at overhead 42 and degassed pulp slurry 44 exits at the bottom. Pressure washer 46 separates the pulp from the filtrate. Most of the water is recycled (streams 40 and 48), the remainder (stream 52) being purged.

In order to further illustrate the present invention, the following examples are provided. These, however, should not be construed to limit the claims.

EXAMPLE I

A hardwood pulp slurry having a consistency of approximately 1.3% and containing approximately 100 ppm by weight oxygen, a portion of it in the form of bubbles (average diameter of 100 to 200 microns), was fed to a twenty-four inch diameter tank. The slurry was agitated with an eight-inch diameter, flat blade, disc turbine impeller mounted on a coaxial shaft rotated at about 200 rpm by a one-third horsepower air-driven motor. The flow induced by the impeller was at least 90% radial. Residence time in the tank was 1.5 minutes, and the average liquid height was 6 inches above the impeller (total liquid height of 22 inches). Four two-inch wide vertical baffles were symmetrically mounted in the tank. Samples of the fiber slurry entering and exiting the tank were taken.

To determine degassing efficiency, a plunger formed by covering a perforated disc with a wire screen filter cloth was moved down through the slurry sample using constant pressure. A pulp mat formed below the plunger surface, and filtrate was forced up through the pulp mat and filter cloth. Filtration time was assumed to be directly related to the quantity of air in the test sample.

The sample of untreated slurry entering the tank required forty seconds to filter. For calculational purposes this time was taken as equivalent to 0% degassing. When the resulting pulp mat was reslurried in the filtrate and stirred to remove trapped gas to provide a sample that was 100% degassed, refiltration required twenty seconds. The discharge sample, which had been processed in accordance with the present invention, required only twenty-five seconds to filter. Measured against the 0% and 100% end-points, twenty-five seconds is equivalent to a 75% degassing efficiency.

COMPARATIVE EXAMPLE

Example I was repeated, except that an 8.7 inch diameter propeller was used instead of the radial-flow impeller. The flow induced was at least 90% axial, that is, less than 10% radial. A sample of test tank effluent required slightly over thirty-four seconds to filter, indicating a degassing efficiency of only 28%. Thus, under identical conditions, the use of a radial-flow impeller results in substantially greater degassing of the pulp slurry (75% efficiency with the radial-flow impeller vs. only 28% with the propeller).

EXAMPLE II

Example I was repeated with a softwood pulp slurry having a consistency of 1.3%. The 100% and 0% degassing times for this system were determined as in Example I. A sample of slurry treated in the vessel filtered at a rate indicating that a 71% degassing efficiency was achieved through use of the present invention.

Variations and modifications of the present invention will be apparent to those skilled in the art. The claims are intended to cover all such modifications and variations as fall within the true spirit and scope of this invention.

I claim:

1. A process for removing a significant portion of the residual oxygen from an aqueous wood fiber slurry that has been bleached with oxygen and contains a gross amount of oxygen, said process comprising the steps:

(a) grossly separating the oxygen from the bleached slurry to leave not more than 350 parts per million by weight of residual oxygen in the slurry;

(b) thereafter agitating the slurry in a vessel in which the slurry has an average height during agitation denominated H, with a radial-flow impeller of diameter D that is at a depth below the average slurry height during agitation, thereby inducing a substantially radially flow of the slurry in the vessel and causing degassing of a significant portion of the residual oxygen, said vessel providing a residence time for the slurry of from 15 seconds to 10 minutes and having substantially vertical baffles to prevent vortex formation; and (c) separating the degassed oxygen from the slurry.

2. The process of claim 1 wherein the diameter of the impeller is from 10 percent to 75 percent of the vessel diameter.

3. The process of claim 1 wherein the depth of the impeller below the average slurry height during agitation is from 20 percent of H to H minus D.

4. The process of claim 1 wherein the consistency of the slurry being agitated is from 0.5 to 3.0 percent.

5. The process of claim 1 wherein the diameter of the impeller is from 10 percent to 75 percent of the vessel diameter, the depth of the impeller below the average slurry height during agitation is from 20 percent of H to H minus D, and the consistency of the slurry being agitated is from 0.5 to 3.0 percent.

6. The process of claim 1 wherein steps (a) and (b) are carried out in the same vessel.

7. The process of claim 1 wherein steps (a) and (b) are carried out in different vessels.

* * * * *